United States Patent

[11] 3,603,701

[72] Inventor Tadeusz Tarcrynski
 Ridley Park, Pa.
[21] Appl. No. 853,873
[22] Filed Aug. 28, 1969
[45] Patented Sept. 7, 1971
[73] Assignee The United States of America as
 represented by the Secretary of the Air
 Force

[54] COMPOSITE ROTOR BLADE RETENTION
 3 Claims, 2 Drawing Figs.
[52] U.S. Cl. .................................................. 416/204,
 416/230
[51] Int. Cl. ..................................................... B64c 27/48
[50] Field of Search ............................................ 416/229,
 230, 241, 209, 204, 239

[56] References Cited
UNITED STATES PATENTS
| | | | |
|---|---|---|---|
| 2,297,142 | 9/1942 | German .......................... | 416/239 (X) |
| 2,303,707 | 12/1942 | Pullin ............................. | 416/209 |
| 3,237,697 | 3/1966 | Ford et al. ....................... | 416/229 (X) |
| 3,303,889 | 2/1967 | Bates .............................. | 416/241 (X) |

Primary Examiner—Everette A. Powell, Jr.
Attorneys—Harry A. Herbert, Jr. and Arsen Tashjian ABSTRACT: A system for transferring the dynamic loading forces from a composite rotor blade held between external and internal metallic fittings. A lock nut in communication with a key serves to transmit torque from the internal fitting to the root end socket by preloading against the composite structure to induce compressive hoop stresses therein.

PATENTED SEP 7 1971 3,603,701

INVENTOR.
TADEUSZ TARCZYNSKI
BY Harry A. Herbert Jr
Arsen Tashjian
ATTORNEYS

COMPOSITE ROTOR BLADE RETENTION

BACKGROUND OF THE INVENTION

This invention relates to a root fitting arrangement for mechanically retaining a composite rotor blade to a rotor hub and, more particularly, the invention is concerned with providing a root fitting which effectively transfers dynamic loading from a composite blade structure exhibiting poor mechanical attachment properties to metal fittings which exhibit good mechanical attachment properties.

In rotor blades of advanced composite structure, the problem arises of transmitting the dynamic loads to the rotor hub. The torque, tension, and bending loads of the rotor blade must be transmitted to the rotor hub through the metal root end fitting. Thus, the attachment means should provide a path for loads from the composite structure to the rotor hub.

SUMMARY OF THE INVENTION

The present invention provides a composite rotor blade retention means whereby the torque, tension and bending loads are transmitted from the rotor blade to the rotor hub. In the region of attachment, a blade internal fitting is provided with a reverse taper which by wedging action creates hoop tension stresses in the blade molded composite structure, whose bursting under these stresses is prevented by the restraining action of the root end socket preloaded against the composite structure by means of a nut. This configuration locks the blade against pull out.

An internal fitting is provided with a fluted portion for transmitting torque from the blade structure to the internal fitting. A key transmits the torque from the internal fitting to the root end socket and a nut preloads the root end socket against the molded composite structure for inducing compressive hoop stresses therein. This arrangement provides an additional path for torque from the composite structure to the outer fitting by friction.

Accordingly, it is an object of the invention to provide a composite rotor blade retention having an internal fitting and root end socket wherein torque, tension and bending loads are transmitted to the rotor hub.

Another object of the invention is to provide a composite rotor blade retension wherein a key transmits the torque from the internal fitting to the root end socket.

Still another object of the invention is to provide a composite blade retention wherein a nut operates to preload the root end socket against the molded composite structure to induce compressive hoop stresses therein.

A further object of the invention is to provide fluting in the internal fitting to transmit torque from the blade structure to the internal fitting.

These and other objects, features, and advantages will become more apparent after considering the description that follows taken in conjunction with the attached drawings wherein like numbers are used throughout to refer to like elements.

IN THE DRAWING

DESCRIPTION OF A PREFERRED EMBODIMENT

Figure 1:
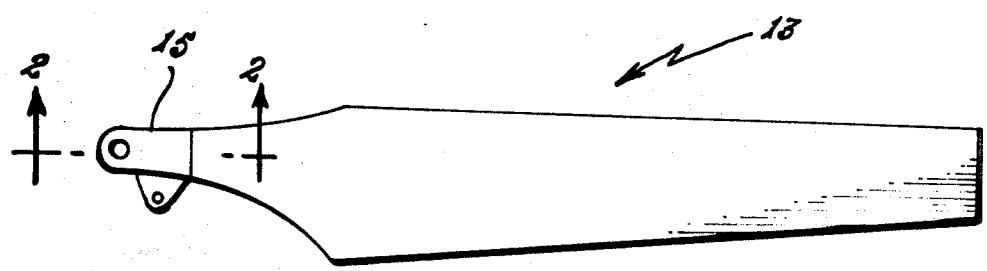
FIG. 1 is a plan view of a rotor blade showing the blade attach lug.
Figure 2:
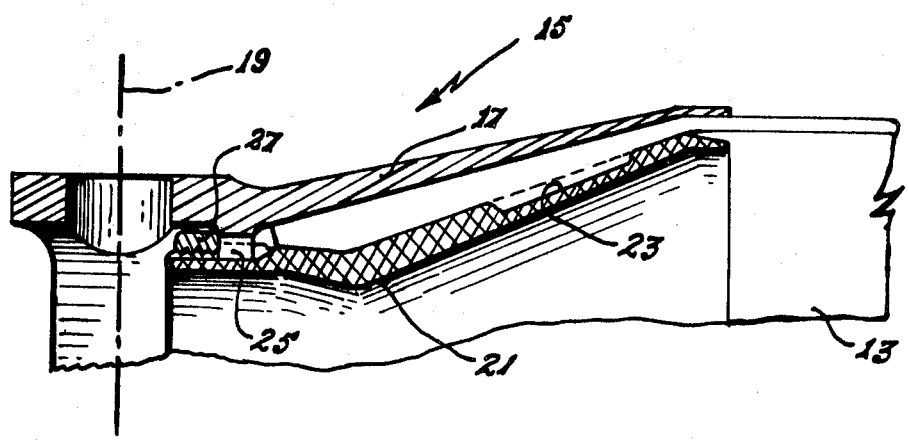
FIG. 2 is an enlarged view in cross section of the blade attach lug taken along the line 2—2 showing the details of the blade retention according to the invention.

Referring now to the drawings, there is shown a rotor blade generally identified by the reference numeral 13 having a blade attach lug 15 attached to the root end of the blade. The details of the lug 15 are shown in enlarged detail in FIG. 2 and include the root end fitting 17 of tapered configuration extending from the rotor blade attach centerline 19 outwardly. An internal fitting 21 is positioned inside in spaced relation to the outer fitting 17. The molded composite structure retained between the inner fitting 21 and the outer fitting 17 is reverse tapered, that is, the thickness dimension starts large and uniformly decreases as it approaches the outer ends of the fittings. This configuration provides lock against pull out of the rotor blade 13 from the fittings. The fluting 23 is included in the internal fitting 21 for transmitting torque from the blade structure 13 to the internal fitting 21.

A key 25 is positioned at the root end socket between the inner ends of the internal and outer fittings and serves to transmit torque from the internal fitting 21 to the root end socket. A nut 27 serves to preload the root end socket against the molded composite structure of the rotor blade 13. In this way compressive hoop stresses are induced in the molded composite structure and provide an additional path for torque from the composite structure to the outer fitting 17 by friction.

It will be appreciated that the design of the attachment of the advanced composite rotor blade to a metal root end fitting enables the use of composites in rotorcraft having a pin connection of the blades to the transmission system. The use of advanced composite design results in much improved blades having the potential of substantial operational improvements for all classes of rotorcraft.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use as composite blades become operational and will produce operational improvement in all classes of rotorcraft.

Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. A rotor blade retention means including a root end socket comprising a molded rotor blade structure, a tapered outer fitting extending outwardly from the blade attach centerline over said rotor blade structure, a correspondingly tapered internal fitting positioned in spaced relation to said outer fitting inside said rotor blade structure, a key positioned between the inner end of said internal fitting and said outer fitting, said key transmitting torque from said internal fitting to the root end socket, and a nut adjacent the inner surface of said key, the adjustment of said nut preloading the root end socket against the inner portion of the composite rotor blade thereby inducing compressive hoop stresses therein.

2. The rotor blade retention means defined in claim 1 wherein the molded composite structure retained between said outer and internal fittings is reverse tapered, the configuration of the socket being larger at the inner end and uniformly decreasing dimensionally toward the outer end.

3. The rotor blade retension means defined in claim 2 wherein the internal fitting is fluted near the outer portion, the fluting operating to transmit torque from the rotor blade structure to the internal fitting.

UNITED STATES PATENT OFFICE
CERTIFICATE OF CORRECTION

Patent No. 3,603,701     Dated September 7, 1971

Inventor(s) TADEUSZ TARCZYNSKI

It is certified that error appears in the above-identified patent and that said Letters Patent are hereby corrected as shown below:

The name of the inventor where it appears on the cover page of the issued patent is misspelled; the correct spelling is TADEUSZ TARCZYNSKI.

Signed and sealed this 8th day of February 1972.

(SEAL)
Attest:

EDWARD M. FLETCHER, JR.
Attesting Officer

ROBERT GOTTSCHALK
Commissioner of Patents